Patented Apr. 1, 1924.

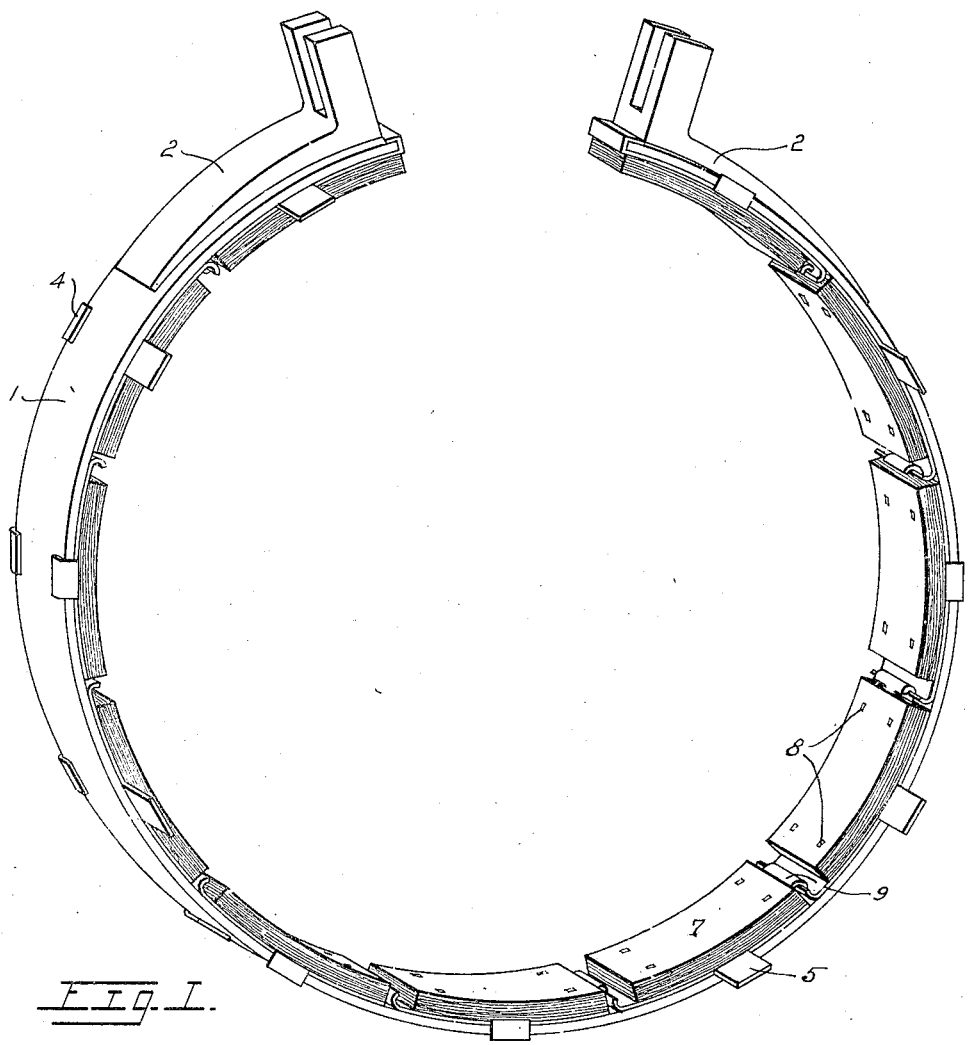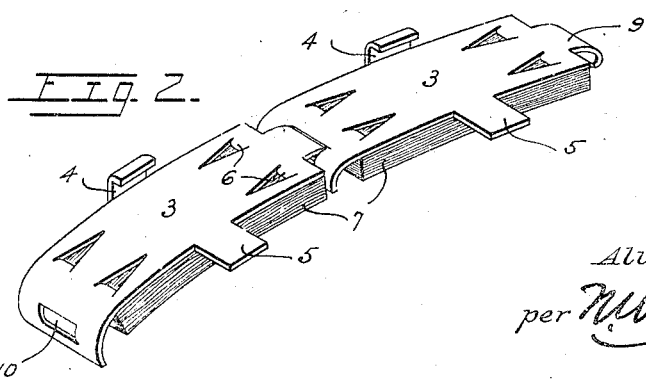

1,488,719

UNITED STATES PATENT OFFICE.

ALVIN H. SWEET, OF LOS ANGELES, CALIFORNIA, ASSIGNOR, BY DIRECT AND MESNE ASSIGNMENTS, TO TITLE GUARANTEE AND TRUST COMPANY, TRUSTEE, OF LOS ANGELES, CALIFORNIA.

BRAKE BAND.

Application filed February 8, 1923. Serial No. 617,776.

*To all whom it may concern:*

Be it known that I, ALVIN H. SWEET, a citizen of the United States, residing at Los Angeles, in the county of Los Angeles and State of California, have invented a new and useful Brake Band, of which the following is a specification.

My invention relates to improvements in brake bands, and particularly when they are housed or relatively inaccessible for re-lining. The objects of my improvement are, first, to provide a sectional lining that may be removed from, or applied to, a brake band without disassembling or removing it from its normal position; and, second, to afford facilities for renewing only a portion of the lining and for re-arranging portions according to their relative condition of wear.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

These objects are attained by the construction illustrated in the accompanying drawing, in which—

Figure 1 is a perspective view of my improved brake band, and Figure 2 is a similar enlarged view of a pair of the lining sections.

Similar numerals refer to similar parts throughout both views.

The brake band strap 1 may be of any usual and suitable form except that, where the width of end clips 2 is the same or nearly equal to the width of the strap, their inner edges should be chamfered adjacent the strap. This is to expose the edges of the strap near its ends to afford facilities for engagement by the lugs of the lining sections.

The lining, previous to assembly, comprises a plurality of coupled sections formed substantially as shown in Fig. 2. Of these the backers 3 are preferably made of sheet steel and have at one side an outwardly extending integral flanged lug 4, and at the other side an opposed integral projecting lug 5 in the plane of the backer. The length of lugs 5 is such that they may be bent to the shape and dimensions of lugs 4. The backers have clinch points 6 pressed inwardly from the material of which they are formed, and friction material 7 is attached to the backers by means of these points as indicated in Fig. 1 at 8.

At their respective ends the backers are provided with co-operative coupling means comprising tongues 9 and slots 10, so that they may be hooked together to form a flexible continuously linked lining of the proper length prior to assembling in the brake strap.

Flanges on lugs 4 and 5 are often superfluous and may be omitted. In such cases, after assembling, the lugs merely extend straight out from the backers, and serve only to keep the sections in place so far as movement parallel to the axis is concerned.

It will be apparent that this construction permits of replacing worn sections, or re-arranging the sections to compensate for irregular wear, without the necessity of discarding the lining as a whole. It will also be obvious that the lining is flexible and otherwise perfectly adapted for braking purposes.

The application of the lining to the brake band, after assembling the lining sections into a continuous string, consists in slipping it into the strap axially and then bending lugs 5 outwardly around their edge of the brake strap. In the case where lugs 4 are flanged they must of course be made to properly engage their edge of the strap prior to bending lugs 5. At the respective ends of the assembled lining the tongue 9 and slotted end 10 are bent so as to hook around the ends of the brake strap in the manner indicated in Fig. 1.

In a previous application filed July 27, 1922, Serial Number 577,935, which has matured into a Patent Number 1,460,118, June 26, 1923, and in companion applications filed coincidently with this, I have shown somewhat similar brake band construction. None of the said applications however claims what is claimed herein.

I claim:

1. A brake lining comprising a plurality of linked sections, each having a radial lug adapted for engaging an edge of a brake strap, and an opposed flat projection adapted for being bent over the other edge of said strap.

2. A brake lining comprising a plurality of linked sections, each having a radial lug adapted for engaging an edge of a brake strap by transverse sliding, and an opposed flat projection adapted for being bent over the other edge of said strap for retaining the lining therein.

3. A brake lining comprising a plurality of linked sections, each having a radial lug adapted for engaging an edge of a brake strap by transverse sliding, and an opposed flat projection adapted for being bent over the other edge of said strap; the lug and bent projection being adapted for maintaining axial and radial relation between said lining and said strap.

4. In combination, a brake band; a lining comprising a plurality of linked sections, each having a radial lug adapted for engaging an edge of said band and an opposed flat projection adapted for being bent over the other edge of said band; and means for retaining said lining in fixed circumferential relation to said band.

5. In combination, a brake band; a lining comprising a plurality of linked sections, each having a radial lug adapted for engaging an edge of said band and an opposed flat projection adapted for being bent over the other edge of said band; and means for retaining said lining in fixed circumferential relation to said band; the lug and bent projection being adapted for maintaining axial and radial relation between said lining and said band.

ALVIN H. SWEET.